Figure 1:
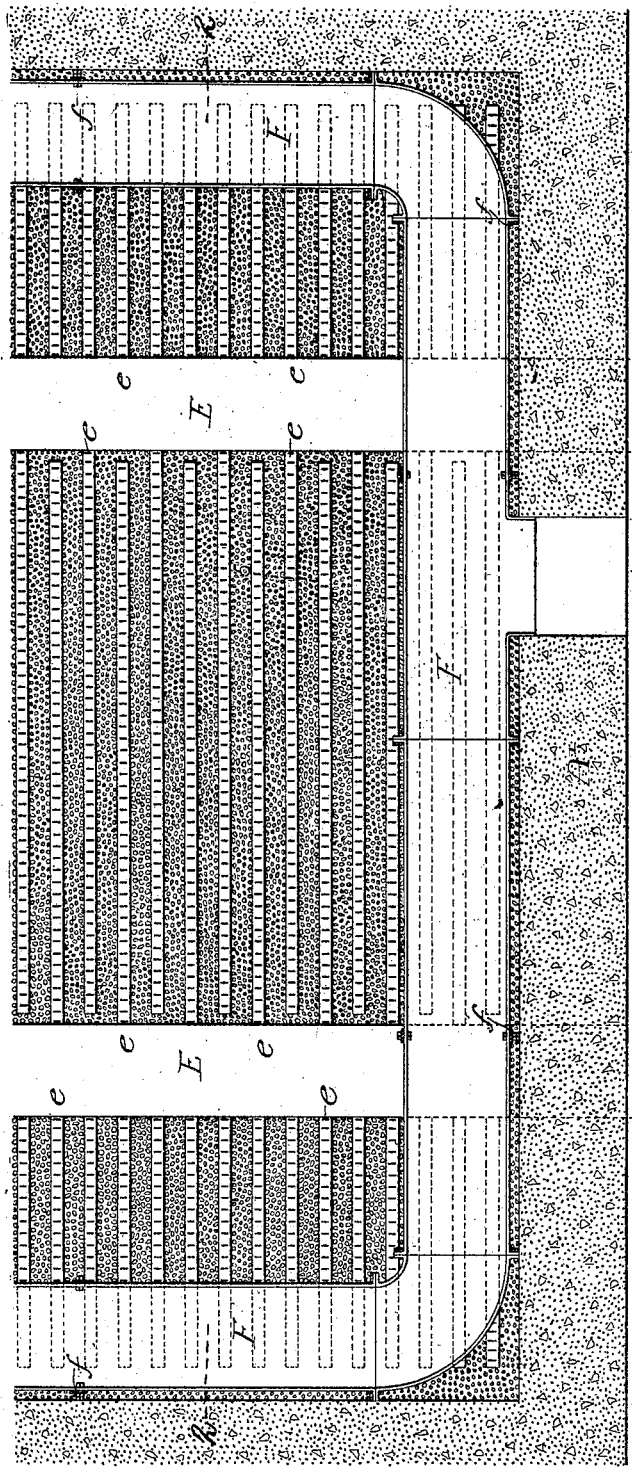

No. 800,107. PATENTED SEPT. 19, 1905.
J. W. HILL.
FILTER.
APPLICATION FILED NOV. 8, 1904.

3 SHEETS—SHEET 1.

Witnesses: Inventor:
John W. Hill.
by his Attorneys;
Howson & Howson

No. 800,107. PATENTED SEPT. 19, 1905.
J. W. HILL.
FILTER.
APPLICATION FILED NOV. 8, 1904.
3 SHEETS—SHEET 2.
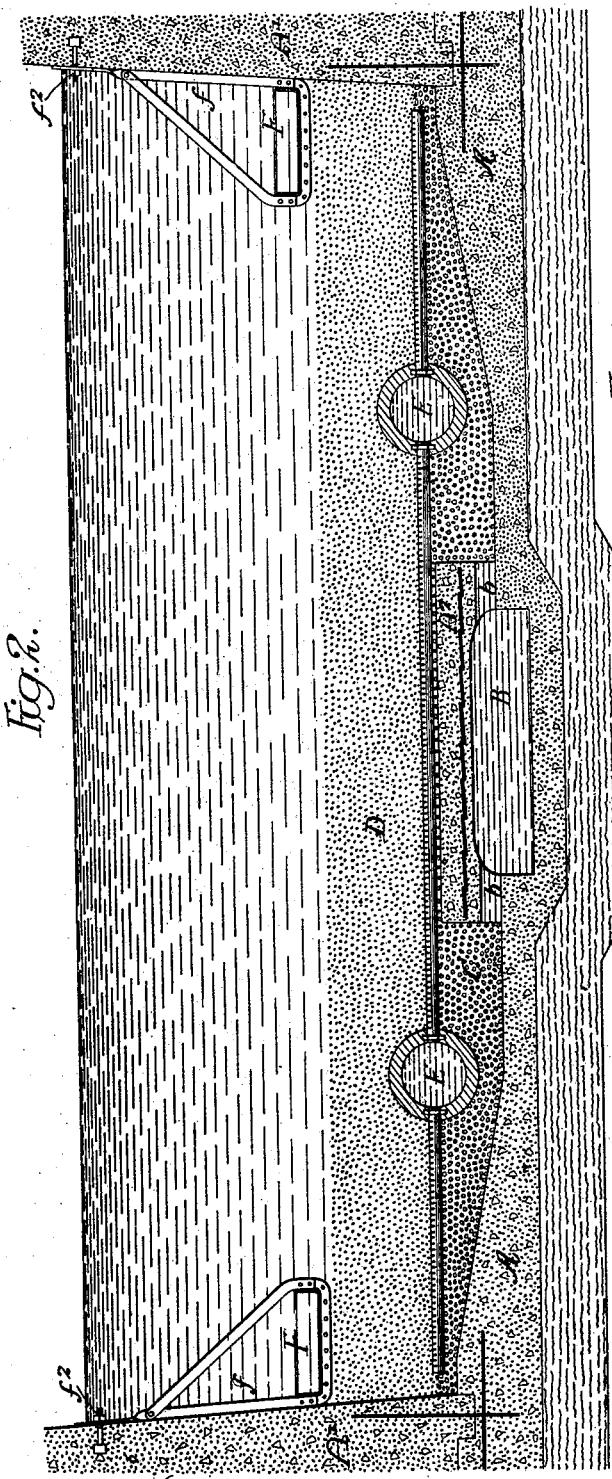
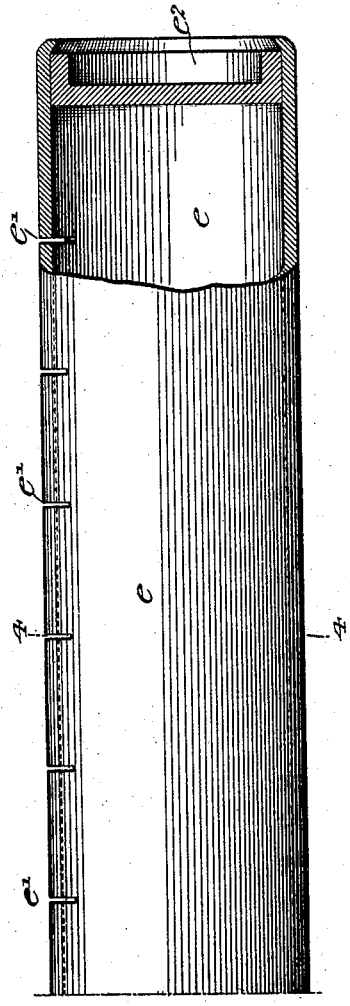
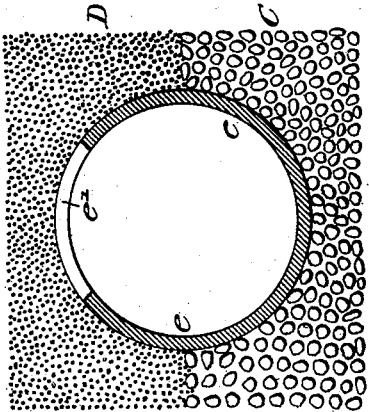
Witnesses:
Wm. A. Barr
Augustus B. Copper
Inventor:
John W. Hill.
by his Attorneys Howson & Howson

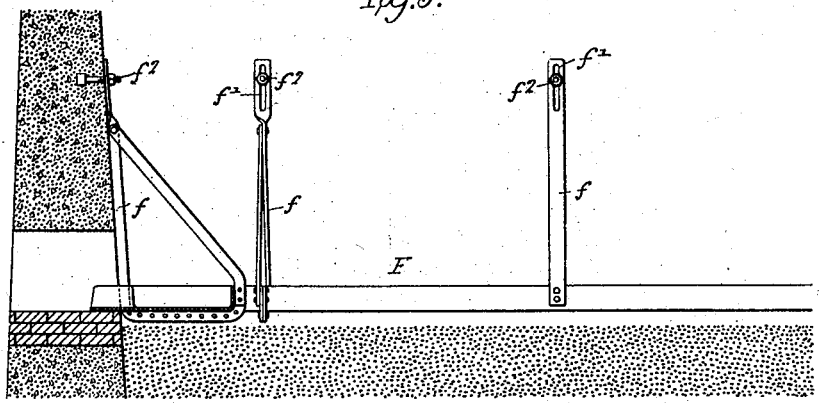
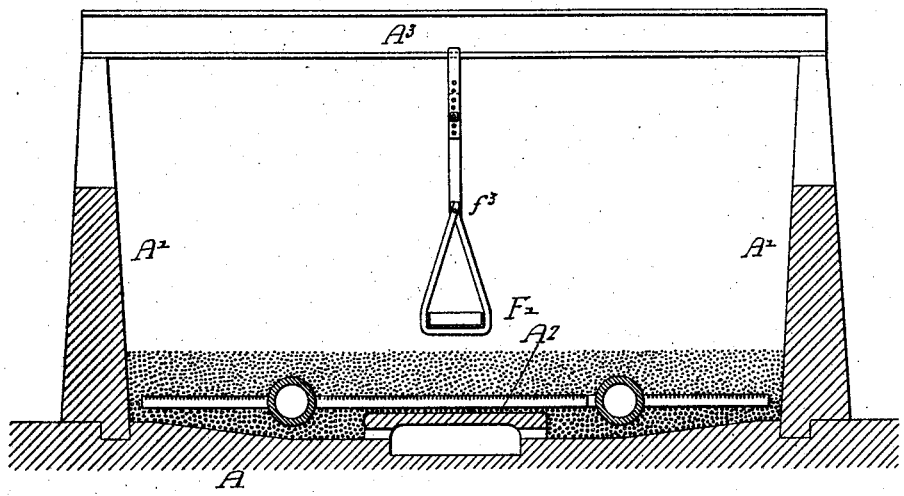

UNITED STATES PATENT OFFICE.

JOHN W. HILL, OF PHILADELPHIA, PENNSYLVANIA.

FILTER.

No. 800,107.     Specification of Letters Patent.     Patented Sept. 19, 1905.

Application filed November 8, 1904. Serial No. 231,919.

*To all whom it may concern:*

Be it known that I, JOHN W. HILL, a citizen of the United States, residing in Philadelphia, Pennsylvania, have invented certain Improvements in Filters, of which the following is a specification.

My invention relates particularly to that class of filters known as "preliminary" or "roughing" filters which prepare very turbid water for final treatment in plain sand-filters by removing at a comparatively high rate of speed of filtration a large percentage of suspended matter, including the bacteria. By the use of the preliminary filters the yield per unit of area of the final filter is materially increased and the efficiency improved at a material reduction in the cost of filtration.

My invention is particularly adapted for use in connection with a filter in which there is a body of coarse supporting material upon which is placed the body of filtering material, the outlet or main collector for the filtered water being below the layer of coarse material and the inlet for water to be filtered being above the filtering material, so that the water will percolate through the body of filtering material and the body of coarse supporting material to the outlet.

The object of my invention is to simultaneously agitate and wash the filtering material only without disturbing the body of coarse supporting material and without the introduction of mechanical stirrers. This object I attain by introducing an independent wash-pipe at the upper surface of the coarse supporting material, as fully described hereinafter, reference being had to the accompanying drawings, in which—

Figure 1 is a plan view of sufficient of one section of a filter to illustrate my invention, the filtering material being removed to expose the wash-pipes and the supporting medium. Fig. 2 is a transverse section on the line 2 2, Fig. 1. Fig. 3 is a side view, partly in section, of one of the slotted lateral pipes. Fig. 4 is a section on the line 4 4, Fig. 3, showing the coarse supporting material and the filtering material. Fig. 5 is a section on the line 5 5, Fig. 1; and Fig. 6 is sectional view illustrating a modification.

It will be understood at the outset that my invention is particularly adapted for preliminary filtering water on a large scale, such as a public water-supply, although it can be used in small filters without departing from my invention.

A is the concrete foundation of the filter, in the present instance having side walls $A'$. Extending longitudinally at the bottom of the filter is a projecting portion $A^2$, inclosing the main collector or outlet B for filtered water. Suitable openings $b$ are provided, which connect the collector with the interior of the filtering-chamber.

C is a body of coarse material through which the water will readily percolate and is spread over the entire bottom of the filter, as indicated in Fig. 2, for a certain depth, so as to provide a suitable porous support for the filtering material D, having myriads of channels through which the filtered water may flow to the main collector. The coarse supporting material in the present instance is gravel about twelve inches in depth, and the gravel ranges in size from two and one-half inches in diameter to a quarter of an inch, and the layer of filtering material is about thirty inches in depth and consists of coarse sand properly prepared. It will be understood that the figures and dimensions above mentioned may be modified without departing from the essential feature of the invention.

Mounted at the surface of the coarse supporting material C are two longitudinally-arranged wash-pipes E E, one on each side of the center, as clearly shown in the drawings, although the number of these pipes may be varied according to the type and dimensions of the filter. The two pipes E E are connected with a main $E'$, and the pipes are provided with suitable valves $e^3$, as clearly shown in Fig. 1. One half of each pipe E in the present instance is embedded within the supporting material C and the other part projects into the bed of filtering material D. Extending laterally from the wash-pipes is a series of small pipes $e$, having perforations in their upper surfaces, so as to allow the wash-water to escape from the pipes through the bed of filtering material. These lateral pipes extend over the surface of the supporting material, and the laterals $e$ of one main pipe E alternate with the laterals of the other main pipe, as clearly shown in Fig. 1, there being sufficient space between the pipes to allow for the passage of the filtered water. I preferably perforate the pipes by slotting, as indicated at $e'$, Figs. 3 and 4, and close one end by a suitable cap $e^2$ in any manner desired. The slots in the pipe allow for the passage of a considerable quantity of water without making the openings of such a width as to admit the particles of sand which make up the filtering-bed, and, furthermore, when the wash-water is admitted under pressure it escapes from the pipes in a flat sheet, which will more readily stir and scour the sand than where the perforations are simply small circular holes.

In the present instance I place a trough F above the bed of filtering material and secure it by brackets $f$ to the walls of the filter. This trough is connected with a suitable sluiceway and is for the purpose of carrying off the wash-water and the dirt held in suspension from the filtering-chamber, so that when the bed of filtering material settles after being washed there will be very little accumulation of foreign material on the surface of the bed and the operation of filtering can be carried on without having to first prepare the bed after the material is agitated. In order to make the trough F adjustable, I slot the brackets at $f'$ for the passage of securing-bolts $f^2$ and make the opening $a$ in the wall of the filter of sufficient depth that the trough can be adjusted, and I fill the opening under the trough with temporary brickwork, as shown in Fig. 5, which can be readily removed when necessary. While I have shown the trough F on each side and at one end of the filtering-chamber, a trough F' may be arranged in the center of the chamber, as shown in Fig. 6. In this instance the trough is suspended from the roof-beams $A^3$ by loops $f^3$, which can be adjusted.

The operation of the filter is as follows: Water is let into the filter until it stands about two feet above the filtering medium and the water flows downward through the layer of supporting material to the effluent-passage. The filtering process is continued until the bed becomes more or less clogged by the intercepted matter in the water. This will be readily ascertained by the loss of head or difference of level of the water in the filter and in the main effluent-pipe, which is indicated by a suitable arrangement of tubes or floats, to which I make no claim in this application. When the loss of head reaches a maximum, then the flow of water to the filter is stopped, the bed of filtering material is drained, and wash-water is then admitted through the pipes and its branches, which will agitate and scrub the particles of sand composing the filtering-bed. The agitation and cleansing process is carried on simultaneously through the entire bed of filtering material. The wash-water is forced through the pipes under sufficient pressure to accomplish the result. The water after it passes up through the filtering-bed is conveyed from the filter through the troughs at the side of the filtering-chamber and the foreign matter held in suspension in the water is carried with the water from the filtering-chamber. After this cleansing operation has been continued for a proper length of time the supply of wash-water is discontinued and the bed is allowed to settle upon the supporting medium, and the water to be filtered is then again introduced and percolates through the filtering-bed and through the supporting material to the outlet or effluent main.

It will be seen by the above-described construction that there is an independent supply-pipe for the wash-water and that the effluent-main is not used for supplying the filter with wash-water, it being solely used for the purpose of carrying off filtered water, and as it is not necessary to cleanse the gravel composing the supporting-body this gravel is not agitated, and consequently always remains in position to properly support the sand filtering-bed. Thus I am enabled with less pressure to properly scrub and agitate the bed of filtering material without disturbing the supporting-bed.

I claim as my invention—

1. The combination in a filter, of a bed of coarse supporting material forming myriads of channels for the escape of filtered water to the outlet, a bed of filtering material above and supported by said bed of coarse material, an inlet for water to be filtered above the said bed of filtering material, an outlet for filtered water below the supporting-bed, a wash-water-supply system situated entirely below the bed of filtering material and of such extent that the entire bed of filtering material will be washed by water escaping from said supply, and an outlet for the wash-water above the bed of filtering material, substantially as described.

2. The combination in a filter, of a bed of coarse supporting material forming myriads of channels for the escape of filtered water to the outlet, a bed of filtering material above and supported by said bed of coarse material, an inlet for water to be filtered above the said bed of filtering material, an outlet for filtered water below the supporting-bed, two longitudinal wash-water-supply pipes having perforated lateral branches, the branches of one pipe alternating with those of the other pipe, said wash-water-supply pipes being situated between the bed of coarse material and the bed of filtering material and so arranged that the entire bed of filtering material will be washed by water escaping from said pipes, and an outlet for the wash-water above the bed of filtering material, substantially as described.

3. The combination in a filter, of a bed of coarse supporting material forming myriads of channels for the escape of filtered water to the outlet, a bed of filtering material above and supported by said bed of coarse material, an inlet for water to be filtered above the said bed of filtered material, a central outlet for filtered water below the supporting-bed, two longitudinal wash-water-supply pipes situated between the bed of coarse material and the bed of filtering material, lateral branches extending from each pipe, said branches being perforated, with an outlet-trough for the wash-water extending around the walls of the filter and above the bed of filtering material, the whole being so constructed that the entire bed of filtering material will be washed by water escaping from the said supply-pipes, substantially as described.

4. The combination in a filter, of a bed of coarse supporting material forming myriads of channels for the escape of filtered water to the outlet, a bed of filtering material above and supported by said bed of coarse material, an inlet for water to be filtered above the said bed of filtering material, an outlet for filtered water below the supporting-bed, a wash-water-supply system situated entirely below the body of filtering material and above the body of coarse supporting material, said water-supply system being of such extent that the entire body of filtering material will be washed by water escaping from said supply without washing the body of supporting material, and an outlet for the wash-water above the body of filtering material, substantially as described.

In testimony whereof I have signed my name to this specification in the presence of two subscribing witnesses.

JOHN W. HILL.

Witnesses:
HENRY C. HILL,
JAMES F. McCRUDDEN.